(12) United States Patent
Whitehead et al.

(10) Patent No.: US 6,215,920 B1
(45) Date of Patent: Apr. 10, 2001

(54) ELECTROPHORETIC, HIGH INDEX AND PHASE TRANSITION CONTROL OF TOTAL INTERNAL REFLECTION IN HIGH EFFICIENCY VARIABLE REFLECTIVITY IMAGE DISPLAYS

(75) Inventors: Lorne A. Whitehead; Dmitri Nikolaevich Grandmaison; Robin John Noel Coope; Michele Ann Mossman; Andrzej Kotlicki, all of Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/324,103

(22) Filed: Jun. 2, 1999

Related U.S. Application Data

(63) Continuation-in-part of application No. 09/133,214, filed on Aug. 13, 1998, now Pat. No. 6,064,784, and a continuation-in-part of application No. 08/872,161, filed on Jun. 10, 1997, now Pat. No. 5,959,777.

(51) Int. Cl.[7] .................................................... G02B 6/26
(52) U.S. Cl. ............................ 385/18; 385/16; 385/147; 385/901; 359/618; 349/63; 362/554
(58) Field of Search ................................... 385/16, 18, 36, 385/133, 147, 901; 359/223, 291, 263, 618, 831, 833; 349/63, 159; 362/554, 556, 560

(56) References Cited

U.S. PATENT DOCUMENTS

| | | |
|---|---|---|
| 3,571,511 | 3/1971 | Myer . |
| 3,612,653 | 10/1971 | Rajchman . |
| 3,698,793 | 10/1972 | Tellerman . |
| 3,730,608 | 5/1973 | Castegnier . |
| 3,746,785 | 7/1973 | Goodrich . |
| 3,796,480 | 3/1974 | Preston, Jr. et al. . |
| 3,987,668 | 10/1976 | Popenoe . |
| 4,148,563 | 4/1979 | Herbert . |
| 4,165,155 | 8/1979 | Gordon, II et al. . |
| 4,218,302 | 8/1980 | Dalisa et al. . |

(List continued on next page.)

FOREIGN PATENT DOCUMENTS

4343808A1    6/1995   (DE) .

OTHER PUBLICATIONS

3M Fluorinert™ Electronic Liquid brochure, http://www.3m.com/fluids/florinrt.html, Sep., 1998.

"Patented fiber switch revs speed, cuts cost", George Kotelly, in "Lightwave" Oct., 1995 web site publication of PennWell Publishing Co., Tulsa, OK.

"Evanescent–wave scattering by electrophoretic microparticles: a mechanism for optical switching", Remillard et al, Applied Optics, vol.34, No.19, Jul. 1, 1995, pp.3777–3785.

*Primary Examiner*—Phan T. H. Palmer
(74) *Attorney, Agent, or Firm*—Oyen Wiggs Green & Mutala

(57) ABSTRACT

Charged particles suspended in a medium such as Fluorinert™ Electronic Liquid are used to electrophoretically control total internal reflection (TIR) at a retro-reflective surface formed on a high refractive index material. Prismatic structures redirect ambient light from an overhead light source toward a display image and then from the image to the region in front of the image, yielding a high contrast reflective display. A transparent planar waveguide front lights the display with sequential flashes of red, blue and green light to generate a full color display. TIR can also be controlled at retro-reflective surfaces by means of a vapor-liquid phase transition, or by changing the absorption coefficient of a material using electrical, chemical and/or electrochemical methods.

60 Claims, 8 Drawing Sheets

U.S. PATENT DOCUMENTS

| | | |
|---|---|---|
| 4,249,814 | 2/1981 | Hull et al. . |
| 4,324,456 | 4/1982 | Dalisa . |
| 4,391,490 | 7/1983 | Hartke . |
| 4,536,061 | 8/1985 | Nishimura . |
| 4,867,515 | 9/1989 | Normandin . |
| 5,045,847 | 9/1991 | Tarui et al. . |
| 5,099,343 | 3/1992 | Margerum et al. . |
| 5,128,782 | 7/1992 | Wood . |
| 5,221,987 | 6/1993 | Laughlin . |
| 5,283,148 | 2/1994 | Rao . |
| 5,301,009 | 4/1994 | Shurtz, II . |
| 5,317,667 | 5/1994 | Weber et al. . |
| 5,319,491 | 6/1994 | Selbrede . |
| 5,396,350 | 3/1995 | Beeson et al. . |
| 5,397,669 | 3/1995 | Rao . |
| 5,455,709 | 10/1995 | Dula, III et al. . |
| 5,530,053 | 6/1996 | Rao et al. . |
| 5,530,067 | 6/1996 | Rao et al. . |
| 5,555,327 | 9/1996 | Laughlin . |
| 5,555,558 | 9/1996 | Laughlin . |
| 5,561,541 | 10/1996 | Sharp et al. . |
| 5,566,260 | 10/1996 | Laughlin . |
| 5,608,837 | 3/1997 | Tai et al. . |
| 5,959,777 * | 9/1999 | Whitehead ............................ 359/618 |
| 6,064,784 * | 9/1999 | Whitehead et al. ................... 385/18 |

* cited by examiner

ELECTROPHORETIC, HIGH INDEX AND PHASE TRANSITION CONTROL OF TOTAL INTERNAL REFLECTION IN HIGH EFFICIENCY VARIABLE REFLECTIVITY IMAGE DISPLAYS

REFERENCE TO RELATED APPLICATIONS

This is a continuation-in-part of U.S. application Ser. No. 09/133,214 now U.S. Pat No. 6,064,784 filed Aug. 13, 1998 (hereafter referred to as the '214 application); and, a continuation-in-part of U.S. application Ser. No. 08/872,161 now U.S. Pat. No. 5,959,777 filed Jun. 10, 1997 (hereafter referred to as the '161 application)

TECHNICAL FIELD

A reflective display device and method of controllably frustrating total internal reflection at an interface between materials having different refractive indices.

BACKGROUND

The '161 application discloses a multiple pixel image display device. Each pixel has at least one element having a reflective state in which incident light undergoes total internal reflection ("TIR"), and having a non-reflective state in which TIR is prevented (i.e. "frustrated"). Such prevention is achieved by modifying the evanescent wave associated with TIR. Specifically, a member is positioned adjacent the element and deformed between first and second positions. In the first position, a gap remains between the member and the element to allow the evanescent wave to have the usual characteristics for TIR. In the second position, the member is in optical contact with the element (that is, the gap thickness is substantially less than an optical wavelength), substantially interfering with the evanescent wave, thus preventing TIR.

The '214 application discloses a number of improvements to the invention disclosed in the '161 application, including the use of electrophoresis to control the TIR phenomenon, redirection of light through two prismatic surfaces in a manner which permits the TIR phenomenon to occur and to be controlled at a flat surface, and the use of both electrophoresis and dual prismatic surfaces to achieve gapless control of the TIR phenomenon at a flat surface.

SUMMARY OF INVENTION

The present invention further improves upon the image displays disclosed in the '161 and '214 applications. In one embodiment, charged particles suspended in a medium such as Fluorinert™ Electronic Liquid are used to electrophoretically control the TIR phenomenon at a retro-reflective surface on a high refractive index material. A second embodiment uses a prismatic structure to redirect ambient light from an overhead light source toward a display image and then from the image to the viewing region in front of the image, yielding a high contrast reflective display. A third embodiment uses a transparent planar waveguide to frontlight a colour display. A fourth embodiment controls the TIR phenomenon at a retro-reflective surface by means of a vapour-liquid phase transition. A fifth embodiment controls the TIR phenomenon by changing the absorption coefficient of a material using electrical, chemical and/or electrochemical methods.

DESCRIPTION

Background

Figure 1:
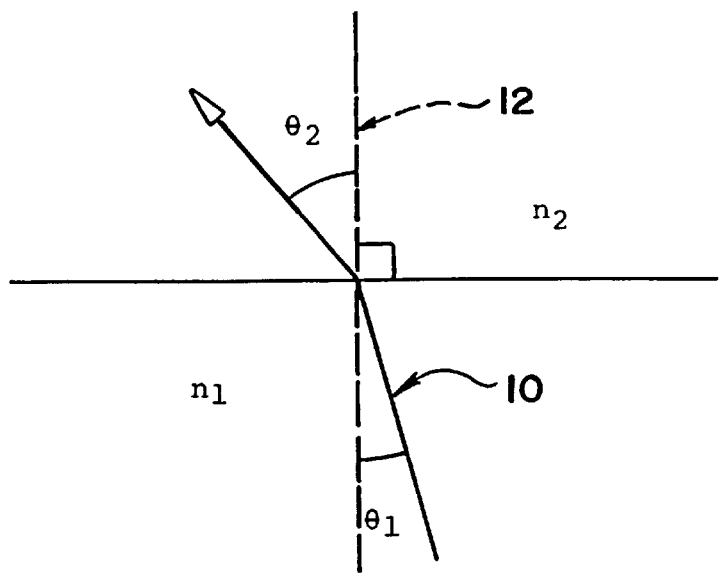
FIG. 1 schematically depicts a light ray undergoing refraction at a glass:air interface.

It is well known that light travels at different speeds in different media. The change of speed results in refraction. Snell's law characterises the behaviour of a light ray which passes from one medium into another medium having a different index of refraction than the first medium. Specifically:

$$n_1 \sin \theta_1 = n_2 \sin \theta_2 \qquad (1)$$

where, as shown in FIG. 1, $n_1$ is the index of refraction of the first medium, $n_2$ is the index of refraction of the second medium, $\theta_1$ is the angle of incidence (or refraction), within the first medium between the light ray and a normal vector to the interface between the two media, and $\theta_2$ is the angle of incidence (or refraction), within the second medium between the light ray and the normal. As shown in FIG. 1, when light ray 10 passes from a higher refractive index medium such as glass, into a lower refractive index medium such as air, ray 10 is refracted away from normal 12. Conversely, if the direction of ray 10 is reversed, such that the ray passes from the lower index medium into the higher index medium, then the ray is refracted toward normal 12.

Thus, when ray 10 exits from the glass into the air, the refracted portion of ray 10 bends away from normal 12. The more the incident portion of ray 10 diverges from normal 12, the more the refracted portion of ray 10 diverges from the normal. Snell's law can be solved as follows to determine the angle $\theta_2$ at which the refracted portion of ray 10 exits from the glass into the air:

$$\theta_2 = \arcsin\left(\frac{n_1}{n_2}\sin\theta_1\right) \quad (2)$$

Sin $\theta_1$ increases as the incident portion of ray 10 within the glass diverges away from normal 12. The $n_1/n_2$ portion of the argument of the arcsine function exceeds 1 (i.e. for glass, $n_1 \approx 1.5$; and, for air $n_2 \approx 1$; so $n_1/n_2 \approx 1.5$). But the maximum value of the sine function is 1, so the arcsine function does not yield real values for values of $n_1/n_2 > 1$. Consequently, if $n_1/n_2 \sin\theta_1 \geq 1$ there is no solution for the refracted angle $\theta_2$. In practice, TIR occurs if $n_1/n_2 \sin\theta_1 \geq 1$ and the incident light ray is reflected back into the glass. The angle at which TIR first occurs as the refracted portion of ray 10 moves away from normal 12 is called the critical angle $\theta_c$, given by:

$$\theta_c = \arcsin\left(\frac{n_2}{n_1}\right) \quad (3)$$

Equation (3) shows that the size of the critical angle is related to the ratio of the two indices of refraction. If the difference between the two indices of refraction is relatively large, then the critical angle will be relatively small (i.e. closer to the normal) and vice versa. For purposes of the present invention, smaller critical angles are preferred since they provide a larger range of angles within which TIR may occur. This means that more incident light can be reflected, and it is consequently possible to provide a display device having an improved range of viewing angles, and/or whiter appearance, both of which are desirable characteristics.

It is well known that the incident portion of a light ray which undergoes TIR slightly penetrates the interface at which TIR occurs. This so-called "evanescent wave penetration" is of the order of about 0.25 micron for visible light. By interfering with (i.e. scattering and/or absorbing) the evanescent wave one may prevent or "frustrate" TIR.

Figure 2:
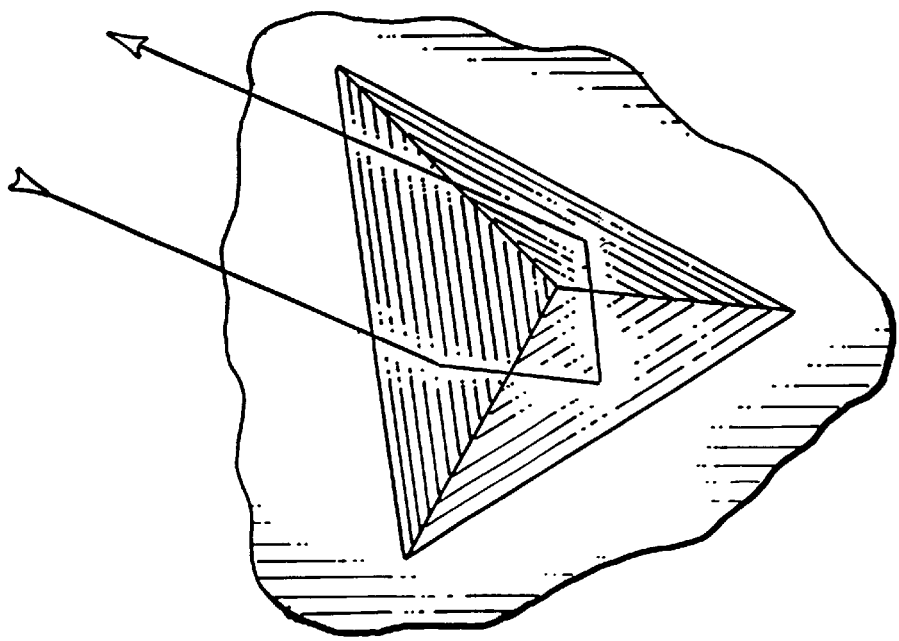
FIG. 2 a pictorial illustration, on a greatly enlarged scale, of the operation of a prior art retro-reflector.

Specifically, one may frustrate TIR by changing the index of refraction of the second medium to bring the magnitude of $n_2$ closer to the magnitude of $n_1$. For example, FIG. 2 depicts a corner reflector (also known as a "corner cube") and shows that an incident light ray undergoes TIR in each of three separate reflections at the three perpendicularly opposed facets which form the corner, with the net result that the light is retro-reflected from the corner reflector in a direction opposite to the direction of the incident ray. If the air ($n \approx 1$) outside the prismatic facet ($n \approx 1.6$) is replaced with a soft rubber gel ($n \approx 1.4$) the critical angle changes from about 38° to about 61°, preventing reflection of most of the incident light. Thus, as explained in the '161 application, TIR can be frustrated by bringing an elastomeric sheet into "optical contact" with a grouping of retro-reflective elements. Optical contact between the elastomeric sheet and the element grouping brings the elastomeric sheet substantially closer than one micron to the grouping, thereby scattering and/or absorbing the evanescent wave adjacent the grouping, thus preventing or frustrating the capability of the corner reflector grouping to totally internally reflect incident light rays.

The Invention

Figure 3:
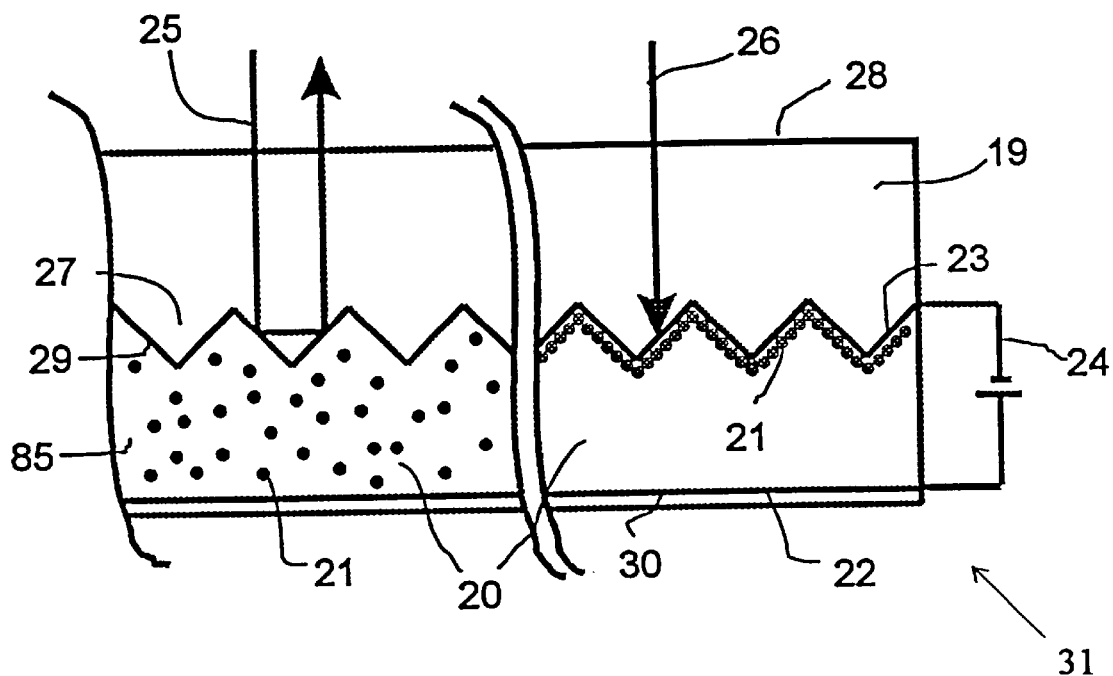
FIG. 3 is fragmented, cross-sectional view, on a greatly enlarged scale, of a retro-reflective high refractive index prismatic surface in contact with an electrophoretic medium through which particles are selectively transported to modify the optical characteristics of the medium at the prismatic interface at which TIR normally occurs. The left side of FIG. 3 shows no electrophoretic activity, such that light rays incident upon the prismatic interface undergo TIR. The right side of FIG. 3 shows the particles electrophoretically transported to the prismatic interface, frustrating TIR such that light incident upon the prismatic interface does not undergo TIR.

The FIG. 3 embodiment of the invention facilitates frustration of TIR without the need for mechanical movement of a part such as the aforementioned elastomeric sheet, without the need for maintenance of a gap (i.e. a region of non-optical contact between materials having different refractive indices) whenever TIR is not to be frustrated, and without the need for a flat surface at the TIR interface.

FIG. 3 depicts an image display device in which a sheet 19 of high refractive index material is positioned with flat viewing surface 28 outward and retro-reflective prism-bearing surface 29 inward. Prisms 27 on surface 29 may have any one of a wide range of prism or near-prism shapes, the only requirement being that prisms 27 be capable of retro-reflecting incident light rays unless TIR is frustrated as hereinafter explained. In particular, prisms 27 may be conventional "corner cube" reflectors. In the example shown, prisms 27 are inclined at an angle of 45° relative to a vector normal to flat surface 28.

Sheet 19 may, for example, be a thin layer of zinc sulfide (ZnS, $n \approx 2.4$), titanium dioxide (TiO$_2$, $n \approx 2.5$), niobium pentoxide (NbO$_5$, $n \approx 2.3$) or zirconium oxide (ZrO, $n \approx 2.1$). Prisms 27 may be formed on surface 29 by machining an initially flat sheet to generate prisms 27; or, by depositing high refractive index material via sputtering or evaporation techniques into a machined mould constituting a physical "negative" of the desired retro-reflective prism-bearing surface 29. Prisms 27 need only be about 2 microns deep, and sheet 19 need only be sufficiently thick (i.e. 5–10 microns) to facilitate provision of a generally but not perfectly flat frontward surface 28. If sheet 19 is insufficiently thick to be self-supporting, an additional sheet (not shown) can be affixed to flat surface 28 to provide the necessary support. Any such additional sheet should be designed to minimize refraction of incident light rays and thus minimize the impact of such additional sheet on the optical characteristics of the device as hereinafter explained.

An electrophoresis medium 20 is maintained in contact with prismatic surface 29 by containment of medium 20 within a reservoir 85 defined by lower sheet 30. The inventors have discovered that a low refractive index, low viscosity, electrically insulating liquid such as Fluorinert™ Electronic Liquid FC-72 ($n \approx 1.25$) or FC-75 ($n \approx 1.27$) heat transfer media available from 3M, St. Paul, Minn. functions remarkably well as an electrophoresis medium in practising the present invention. A Fuorinert:ZnS TIR interface is thus formed (assuming ZnS is used to form sheet 19). Medium 20 contains a finely dispersed suspension of light scattering and/or absorptive particles 21 such as dyed or otherwise scattering/absorptive silica particles ($n \approx 1.44$), dyed or otherwise scattering/absorptive latex particles ($n \approx 1.5$), etc. The optical characteristics of sheet 30 are relatively unimportant; sheet 30 need only form a reservoir for containment of electrophoresis medium 20 and particles 21.

As previously explained, a small critical angle is preferred at the TIR interface since this affords a large range of angles over which TIR may occur. The relatively large ratio of the index of refraction of ZnS to that of Fluorinert yields a critical angle of about 32°, which is quite small. In the absence of electrophoretic activity, as is illustrated for the left side of medium 20 in FIG. 3, an incident light ray 25 which passes through sheet 19 undergoes TIR at the ZnS:Fluorinert interface and is retro-reflected as illustrated. This is because the 45° angle at which ray 25 encounters a first one of the prism faces at the ZnS:Fluorinert TIR interface exceeds the interface's 32° critical angle. The reflected light ray then encounters a second prism face, opposite the first prism face, and again undergoes TIR at the second prism face, because the 45° angle at which the reflected ray encounters the second prism face (which also forms part of the ZnS:Fluorinert TIR interface) exceeds the interface's 32° critical angle. After twice undergoing TIR at retro-reflective surface 29 as aforesaid, the retro-reflected ray is re-emitted through the ZnS:air interface and emerges, as illustrated, in a direction nearly 180° opposite to the direction of the original incident ray, thus achieving a "white" appearance in the reflected light. If prisms 29 are corner reflectors, or other three dimensional retro-reflective structures, then incident ray 25 undergoes TIR three times at retro-reflective surface 29 before being re-emitted through the ZnS:air interface in a direction nearly 180° opposite to the direction of the original incident ray.

A voltage can be applied across medium 20 via electrodes 23, 22 which are respectively deposited on surfaces 29, 30. Electrode 23 is transparent and substantially thin such that it does not interfere with incident rays at the ZnS:Fluorinert TIR interface. Electrode 22 need not be transparent. If electrophoresis medium 20 is activated by actuating voltage source 24 to apply a voltage across medium 20, as is illustrated for the right half of medium 20 depicted in FIG. 3, suspended particles 21 are electrophoretically moved to within about 0.25 micron of the ZnS:Fluorinert interface (i.e. inside the evanescent wave region). "Electrophoresis" is a well-known phenomenon whereby a charged species (i.e. particles, ions or molecules) moves though a medium due to the influence of an applied electric field. When electrophoretically moved as aforesaid, particles 21 scatter or absorb light, by causing a refractive index mismatch at the ZnS:Fluorinert interface. This is illustrated by light ray 26 in FIG. 3, which is scattered and/or absorbed as it strikes particles 21 inside the evanescent wave region at the ZnS:Fluorinert interface, thus achieving a "dark" appearance in the non-reflective absorption region.

The optical characteristics of surface 29 can be controlled by controlling the voltage applied across medium 20 via electrodes 22, 23. Moreover, the electrodes can be segmented to control the electrophoretic activation of medium 20 across separate regions or "pixels" of surface 29, thus forming an image display.

A key characteristic of the FIG. 3 embodiment of the invention is the large refractive index mismatch between sheet 19 and electrophoretic medium 20. If the index mismatch is insufficient to attain the critical angle at the TIR interface, then the structure depicted in FIG. 3 will not work. In such case, a pair of prismatic surfaces can be used to ensure that the incident light rays encounter the TIR interface at the requisite angle, as is described in relation to the FIG. 5A embodiment of the '214 application. The FIG. 3 embodiment of the present invention provides an important simplification by dispensing with the need for dual prismatic surfaces.

Besides having the desired low refractive index, Fluorinerts are well also suited to use in displays formed in accordance with the invention because they are good electrical insulators, and they are inert. Fluorinerts also have low viscosity and high density, so particles suspended in Fluorinerts can be moved electrophoretically relatively easily. As noted above, ZnS is a preferred high refractive index material suitable for use in forming sheet 19. The sheet is preferably optically clear and has a high refractive index of approximately 2.4 in the range of visible wavelengths of light. (By "optically clear", it is meant that a substantial fraction of light incident on the material at normal incidence will pass through a selected thickness of the material, with only a small fraction of such light being scattered and/or absorbed by the material. Diminished optical clarity is caused by such scattering and/or absorption, typically a combination of both, as the light passes through the material. In the FIG. 3 embodiment of the invention, sheet 19 need only be approximately 10 microns thick. A material which is "opaque" in bulk form may nevertheless be "optically clear" for purposes of the present invention, if a 10 micron thickness of such material scatters and/or absorbs only a small fraction of normal incident light.) ZnS is also well suited to use in displays formed in accordance with the invention because it has low absorption/scattering characteristics and consequently high optical clarity in the aforementioned wavelength range. Further, ZnS is available in sheet form and can be machined to yield the desired retro-reflective microstructure as explained above.

Application of a voltage across medium 20 by means of electrodes 22, 23 and voltage source 24 electrostatically charges particles 21, causing them to move into the evanescent wave region as aforesaid. When particles 21 move into the evanescent wave region they must be capable of frustrating TIR at the ZnS:Fluorinert interface, by scattering and/or absorbing the evanescent wave. Although particles 21 may be as large as one micron in diameter, the particles' diameter is preferably significantly sub-optical (i.e. an order of magnitude smaller than one micron, say 100 nm in diameter) such that a monolayer of particles at the TIR interface entirely fills the evanescent wave region. Useful results are obtained if the diameter of particles 21 is about one micron, but the image display device's contrast ratio is reduced because the ability of particles 21 to pack closely together at the TIR interface is limited by their diameter. More particularly, near the critical angle, the evanescent wave extends quite far into medium 20, so particles having a diameter of about one micron are able to scatter and/or absorb the wave and thereby frustrate TIR. But, as the angle at which incident light rays strike the TIR interface increases relative to the critical angle, the depth of the evanescent wave region decreases significantly. Relatively large (i.e. one micron) diameter particles cannot be packed as closely into this reduced depth region and accordingly such particles are unable to frustrate TIR to the desired extent. Smaller diameter (i.e. 100 nm) particles can however be closely packed into this reduced depth region and accordingly such particles are able to frustrate TIR for incident light rays which strike the TIR interface at angles exceeding the critical angle.

As explained in the '161 and '214 applications, mechanical frustration of TIR (i.e. by moving an elastomeric sheet into and out of the evanescent wave region) is best accomplished at a flat surface, since it is easier to achieve optical contact at a flat surface. It is comparatively difficult to mechanically frustrate TIR at a prismatic surface, due to the difficulty in attaining the required alignment accuracy between the prismatic surface and the part which is to be mechanically moved into and out of optical contact with the prismatic surface. However, electrophoretic medium 20 easily flows to surround retro-reflective prism-bearing surface 29, thus eliminating the alignment difficulty and rendering practical the usage of a prismatic micro-structured surface as the TIR interface.

Figure 4A:
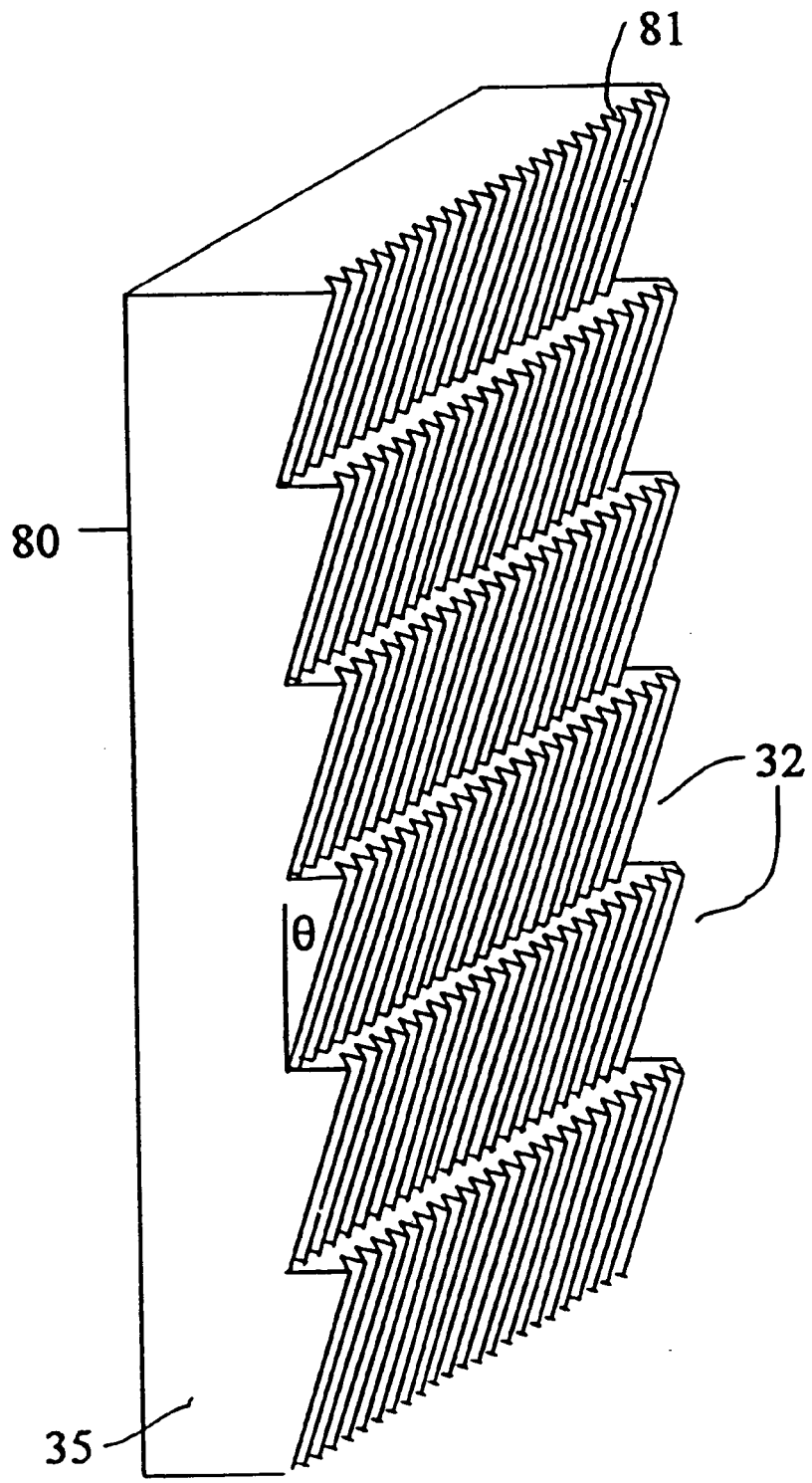
FIG. 4A is an isometric view, on a greatly enlarged scale, of a portion of a prismatic, micro-structured surface which can be positioned such that light rays incident upon the surface at a pre-selected angle, in this case 45° ambient light, are directed toward an image, such that the image then reflects the light rays away from the image in a preferred direction for viewing the image.
Figure 4B:
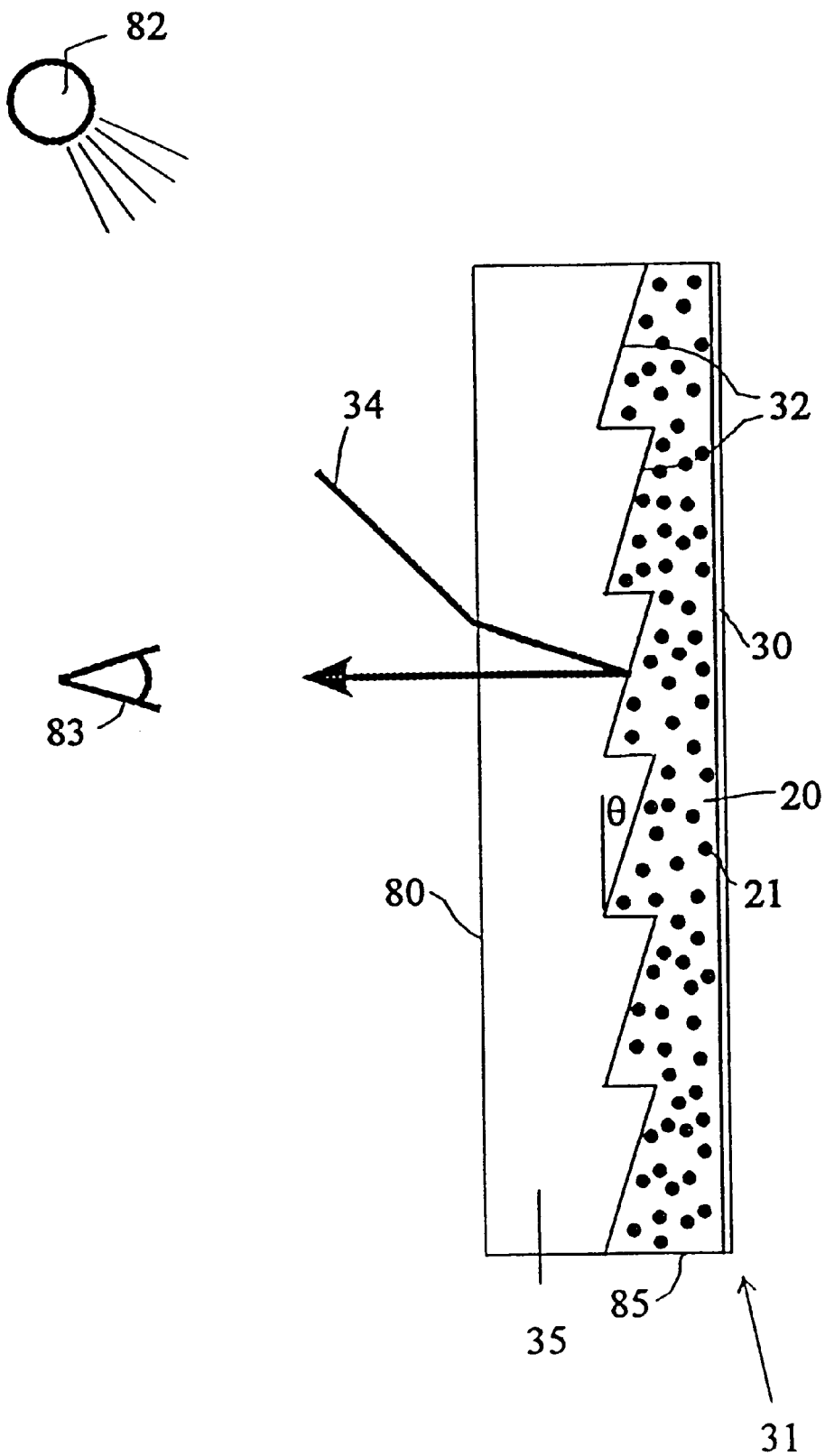
FIG. 4B is a side elevation view, on a greatly enlarged scale, of a portion of a high reflectivity, high contrast image display incorporating the FIG. 4A micro-structured surface and the FIG. 3 electrophoretic:high index retro-reflective structure.

FIG. 4B schematically depicts an image display device 31 in which a prismatically structured sheet 35 (FIG. 4A) of high refractive index material is interposed between device 31 and the observer 83. As shown in FIG. 4A, in its vertical operational orientation, sheet 35 has a flat outward face 80 and an opposed inward face bearing a vertically stacked plurality of horizontally extending prismatic segments 32. Each segment 32 consists of a plurality of vertically inclined, parallel prisms 81. Each segment 32 is inclined at an angle θ with respect to the vertical, where:

$$\theta = \frac{1}{2}\arcsin\left(\frac{n_2 \sin\phi}{n_1}\right)$$

where φ is the angle of incident ambient light (typically 45°), $n_2$ is the index of refraction of the medium adjacent outward face 80 through which the ambient light passes (i.e. air, $n_2 \approx 1$), and $n_1$ is the index of refraction of the structured material comprising sheet 35. If the material comprising sheet 35 is ZnS ($n_1 \approx 2.4$) then θ ≈8.5°.

Prisms 81 and segments 32 may be formed by machining an initially flat sheet; or, by depositing a high refractive index material via sputtering or evaporation techniques into a machined mould constituting a physical "negative" of the desired prism-bearing structure. Prisms 81 need only be about 2 microns deep, and sheet 35 need only be sufficiently thick (i.e. 5–10 microns) to facilitate provision of a generally but not perfectly flat outward viewing surface 80. If sheet 35 is insufficiently thick to be self-supporting, an additional sheet (not shown) can be affixed to surface 80 to provide the necessary support. Any such additional sheet should be designed to minimize refraction of incident light rays and thus minimize the impact of such additional sheet on the optical characteristics of the device as hereinafter explained.

As depicted in FIG. 4B, an incident light ray 34 emanating from overhead light source 82 strikes outward, vertically oriented, face 80 at approximately 45°. Ray 34 is refracted by sheet 35. For an air:ZnS interface, the refraction angle is about 28°. The refracted ray then encounters one of inclined prisms 81 at about 8.5°, and is specularly reflected therefrom. Since prism segments 32 are also inclined at 8.5°, specular reflection of ray 34 by one of inclined prisms 81 results in TIR of ray 34 toward observer 83, as illustrated. Thus, if sheet 35 is an image display surface as hereinafter explained, sheet 35 can be positioned to redirect ambient light which strikes sheet 35 at about 45° from above observer 83, toward the image display surface at which the light undergoes TIR and is redirected toward observer 83.

In order to redirect light from source 82 so as to increase the contrast of the image display, the length dimension of prism segments 32 should be substantially (i.e. 10 to 100 times) larger than the height dimension of each of prisms 81. This facilitates specular reflection as aforesaid in a manner which minimizes optical interference at the "step" boundaries between the inwardly recessed edge of one segment 32 and the upwardly protruding edge of the immediately adjacent segment. An appropriate design trade off must be made in minimizing the total number of such "step" boundaries, without substantially increasing the thickness of sheet 35.

The FIG. 3 and 4A embodiments can be combined to yield an image display device 31 (FIG. 4B) in which TIR is controllably frustrated from the rearward side (i.e. the right side, as viewed in FIG. 4B) of prismatic segments 32. In particular, reservoir 85 is defined by sheet 30 behind (i.e. to the right of) sheet 35. Reservoir 85 contains an electrophoretic medium in which a plurality of light scattering and/or absorbing particles are suspended as previously described in relation to FIG. 3. If the particles are not present in selected portions of the evanescent wave region, ambient light emitted by source 82 is specularly reflected by such portions, which accordingly appear highly reflective or white to observer 83. However, if the particles are electrophoretically moved into the evanescent wave region, specular reflection of ambient light emitted by source 82 is frustrated at such portions, which accordingly appear dark to observer 83.

Figure 5A:
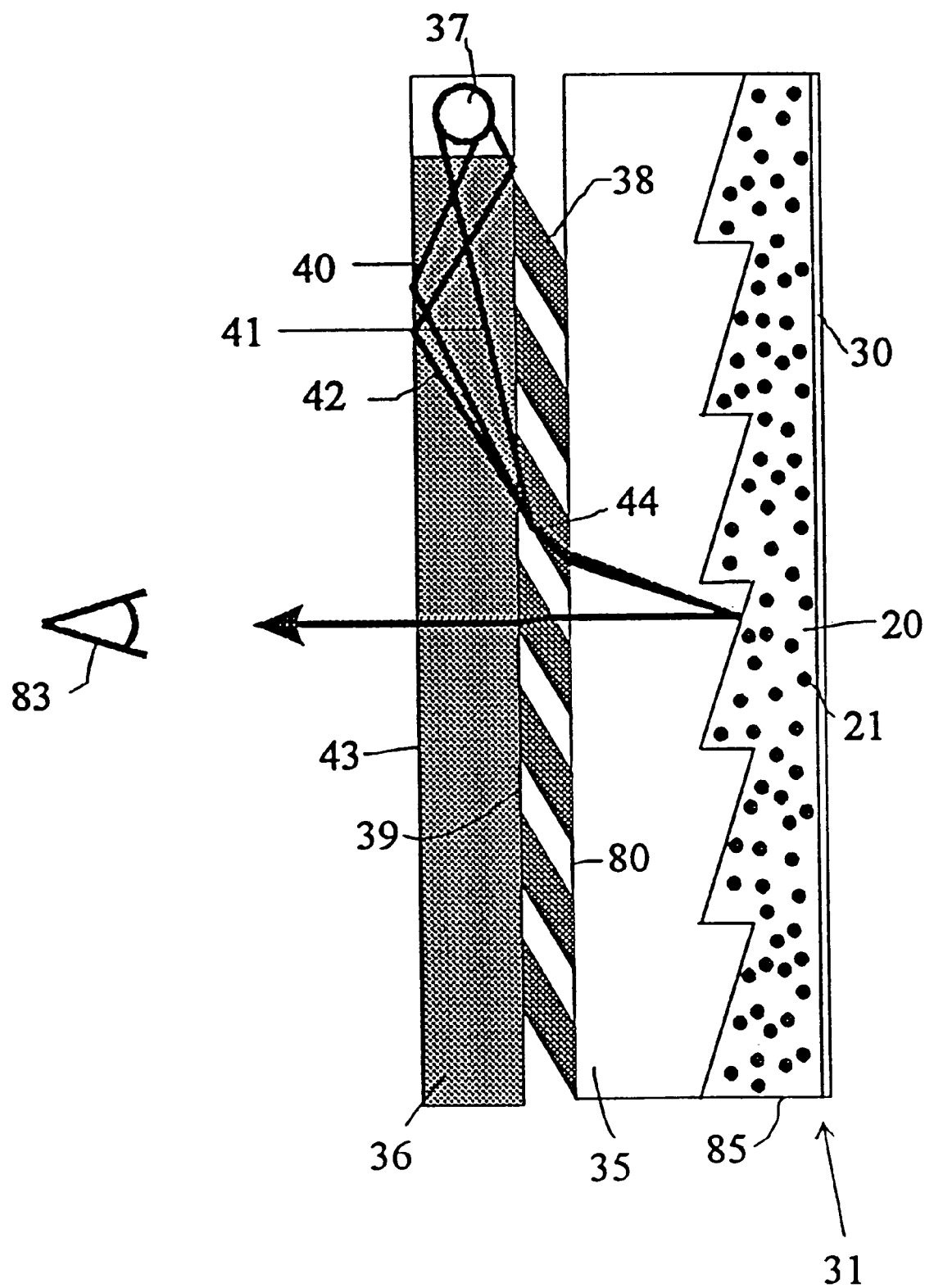
FIG. 5A is a cross-sectional view, on a greatly enlarged scale, of a portion of a high reflectivity, high contrast image display incorporating a transparent planar waveguide front light.

FIG. 5A shows how the embodiments of FIGS. 3, 4A and/or 4B can be adapted for use with an integral planar waveguide front light source, enhancing performance in low ambient light conditions. A transparent, planar slab waveguide 36 of the type described in U.S. Pat. No. 5,396,350 is mounted in front of the previously described image display device 31. Light source(s) 37 (which may for example comprise a plurality of light emitting diodes) emit light into waveguide 36 through one or more of the waveguide's elongate edges. A transparent micro-structured array 38 is mounted between the waveguide's rearward surface 39 and frontward surface 80 of image display device 31. Array 38 can be any type of micro-structure (i.e. prisms, trapezoids, louvers, etc.) capable of uniformly extracting light rays from waveguide 36 and redirecting the extracted rays toward surface 80 at an incident angle of approximately 45°.

As depicted in FIG. 5A, light rays 40, 41 emitted by light source 37 undergo TIR as they strike either the frontward or rearward surfaces 43, 39 of waveguide 36, thus initially confining such rays within waveguide 36. But, if a ray strikes rearward surface 39 at a point at which one of the micro-structures comprising array 38 contacts surface 39, then the conditions necessary for TIR are not satisfied (due to the refractive index mismatch between waveguide 36 and array 38), allowing such rays to escape from waveguide 36 and pass through array 38 into image display device 31. More particularly, rays which escape from waveguide 36 into array 38 are reflected rearwardly of array 38 by side wall 44 at a preferential angle of 45° relative to frontward surface 80 of image display device 31. An array 86 of micro-structured lenses (FIG. 5B) can be provided to further assist in directing light extracted from waveguide 36 toward frontward surface 80 at the preferred 45° angle as aforesaid.

Light rays directed toward frontward surface 80 at the preferred 45° angle are either reflected or absorbed by image display device 31, as previously described in relation to the FIG. 4B embodiment. The result is an efficient, high contrast, uniformly illuminating front light for an image display having a narrow profile as is desired in flat panel display applications. In low ambient light conditions, the FIGS. 5A, 5B embodiments yield high contrast black and white or monochrome images, assuming a white light source. In bright ambient light conditions, light source 37 can be de-energized without substantially affecting the high contrast ratio of the image display device.

Figure 5B:
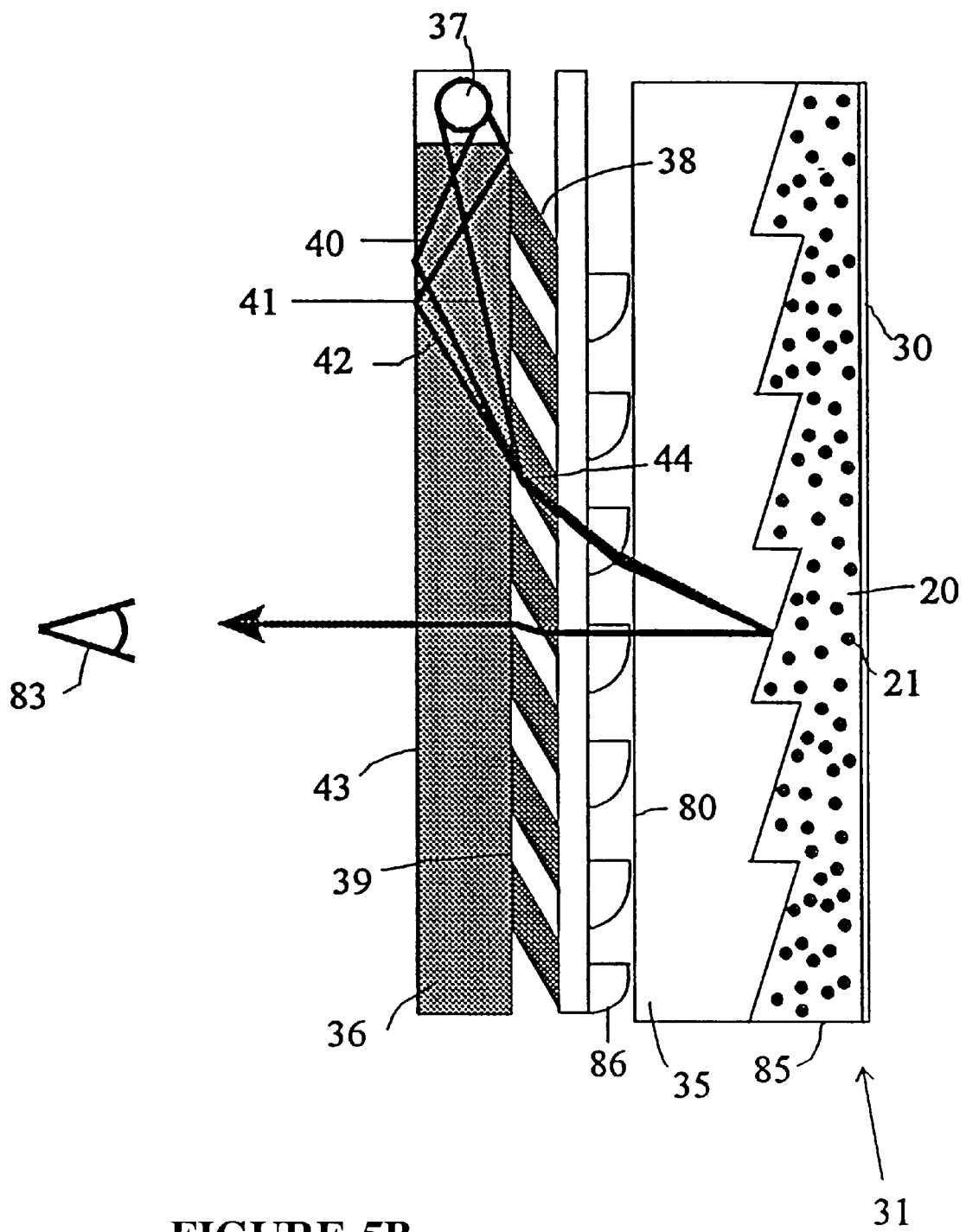
FIG. 5B shows how an array of micro-structured lenses can be incorporated in the FIG. 5A structure to improve extraction of light from the waveguide in a preferential direction.

A particular advantage of the FIGS. 5A, 5B embodiments is the ability to produce a high contrast multi-coloured image display. In particular, light source 37 may comprise a plurality of red, blue and green light emitting diodes which can be sequentially activated to emit red, blue or green light into waveguide 36 during selected time intervals. Such coloured light sources may have various configurations provided they are capable of uniformly emitting light into waveguide 36 for redirection as aforesaid. If coloured light is efficiently emitted into waveguide 36, the colour of the light which escapes through array 38 for redirection or absorption by image display device 31 is governed by the intensity of light source 37. Since the colour of the reflected image perceived by observer 83 is dependent upon the colour provided by light source 37 and waveguide 36 as aforesaid, the perceived image's colour can be controlled by controlling the colour of light source 37.

For example, consider the situation in which it is desired to produce one or more red image pixels on display device 31 for perception by observer 83. The selected red pixel(s) on image display device 31 are placed in a highly reflective or "on" state by actuating device 31 such that the particles suspended in electrophoretic medium 20 are not clustered within the evanescent wave region at the TIR interface between prisms 81 and medium 20 over those portions of the display comprising the selected red pixel(s). The non-selected pixel(s) (i.e. the remaining, non-red pixel(s)) are placed in an absorptive or "off" state by actuating device 31 such that the particles suspended in electrophoretic medium 20 are clustered within the evanescent wave region at the TIR interface between prisms 81 and medium 20 over those portions of the display comprising the non-selected pixel(s). The red light emitting portions of light source 37 are then actuated to emit red light into waveguide 36, which is directed toward frontward surface 80 at the preferred 45° angle as aforesaid and then through sheet 35 to the TIR interface. The selected (and now highly reflective) pixel(s) reflect the red light. Observer 83 accordingly perceives the selected pixel(s) as red. In similar fashion, selected pixels can be selected and caused to reflect blue or green light in sufficiently rapid succession that observer 83 perceives a full colour image comprised or red, blue and green pixels.

Figure 6:
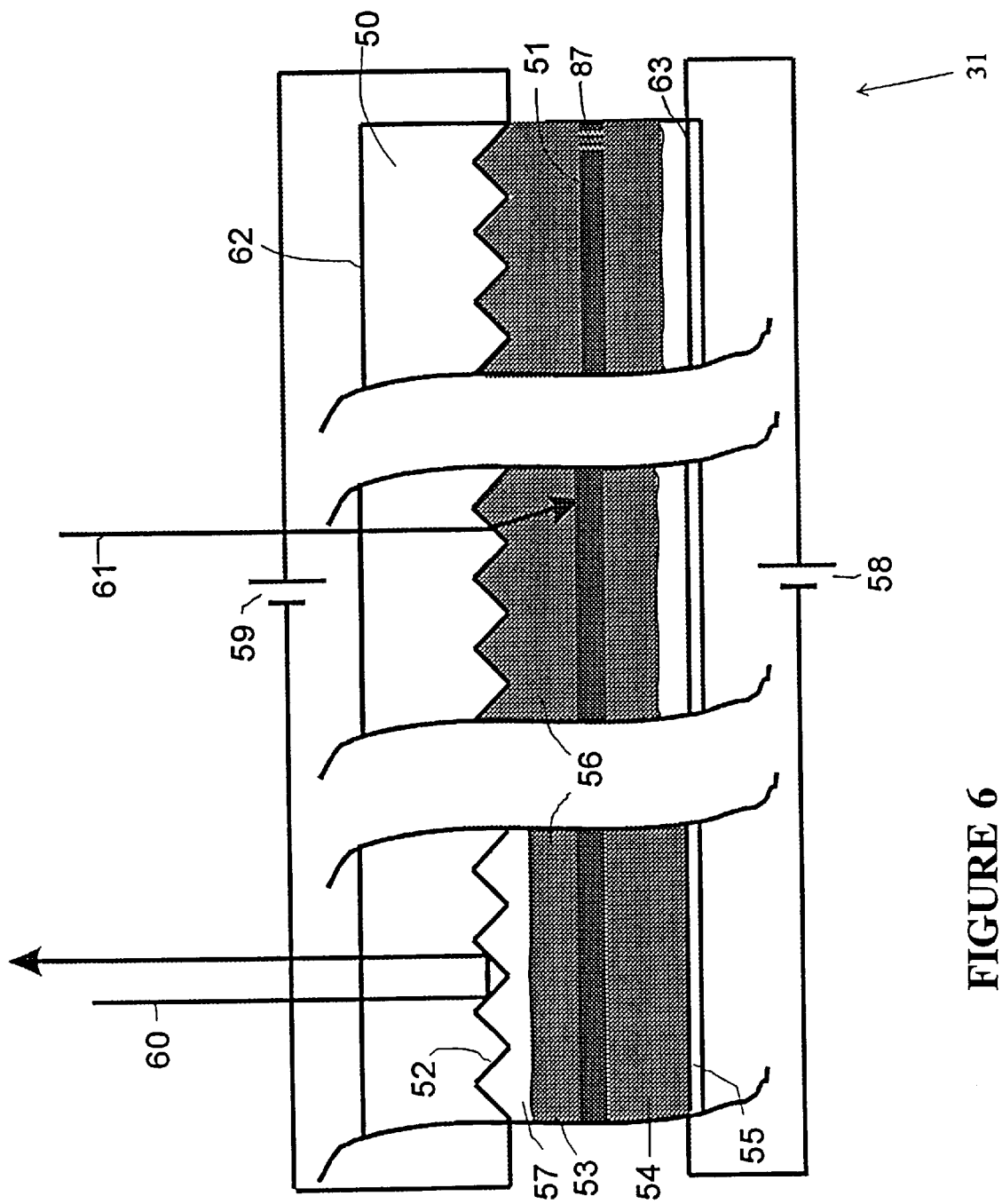
FIG. 6 is fragmented, cross-sectional view, on a greatly enlarged scale, of a high reflectivity, high contrast image display in which liquid:vapour phase transitions control TIR. The left portion of FIG. 6 shows a vapour created adjacent a prismatic surface to provide a refractive index mis-match whereby incident light rays undergo TIR. The centre portion of FIG. 6 shows liquid adjacent the prismatic surface, providing substantial matching of refractive indices whereby TIR is frustrated. The right portion of FIG. 6 depicts apertures through which the liquid flows between upper and lower chambers.

FIG. 6 depicts an image display device in which phase transitions of a low boiling point liquid are used to controllably frustrate TIR. A sheet 50 of a material, such as 3M Diamond Grade™ reflective polycarbonate sheeting, is positioned with its flat viewing surface 62 outward and its retro-reflective prism-bearing surface 52 inward. The prisms on surface 52 may have any one of a wide range of prism or near-prism shapes, the only requirement being that the prisms be capable of retro-reflecting incident light rays unless TIR is frustrated as hereinafter explained.

Backing sheet 55 vacuum seals the region beneath retro-reflective prism-bearing surface 52 to form a compartment having first and second chambers 53, 54. Chambers 53, 54 can be entirely separate chambers; or as shown in FIG. 6, they may be formed by using a thermal barrier 51 to horizontally divide a single, larger chamber into upper and lower chambers. Thermal barrier 51 is a black, light absorbing material having a plurality of apertures 87 (see right portion of FIG. 6), through which liquid 56 can flow freely between chambers 53, 54. Apertures 87 are located around the outer perimeter of barrier 51 to minimize interference with the optical characteristics of viewing surface 62. The optical characteristics and surface profile of sheet backing 55 are not critical. Sheet 55 simply provides a physical and thermal barrier for containment of liquid 56 in chamber 54.

Liquid 56 may be Fluorinert™ Electronic Liquid FC-72 (n≈1.25), FC-75 (n≈1.27), pentane ($C_5H_{12}$, n≈1.36) or hexane ($C_6H_{14}$, n≈1.38). The refractive index of liquid 56 is substantially similar to the refractive index of sheet 50 (i.e. for polycarbonate, n≈1.6) and liquid 56 is preferably easily vapourized (i.e. has a relatively low boiling point at the pressure within chambers 53, 54).

Prismatic surface 52 and surface 63 of lower sheet 55 are coated with thin transparent electrode films (not shown) comprised of a material such as a metal oxide. Voltage sources 58, 59 are controllably electrically connected to the electrodes to resistively heat one or the other of the electrodes and thereby vapourize liquid 56 in the region adjacent the heated electrode. More particularly, when voltage source 59 is electrically connected to the electrode on surface 52, heat generated within the electrode causes a liquid-to-vapour phase transition of the liquid 56 contacting the heated portion of surface 52, thereby forming vapour barrier 57 between surface 52 and liquid 56, as seen in the left portion of FIG. 6. When voltage source 59 is disconnected from the electrode on surface 52, and voltage source 58 is electrically connected to heat the electrode on surface 63, vapour barrier 57 reverts to the liquid phase at surface 52; and, simultaneously liquid 56 in contact with the (now heated) electrode on surface 63 undergoes a phase transition to the vapour state, as shown at 64 in the central portion of FIG. 6. Vapour layer 64 has no optical effect, but reversal of the voltage potentials applied to the electrodes on surfaces 52, 63 as aforesaid accelerates the vapour-to-liquid phase transition at surface 52. The liquid-to-vapour and vapour-to-liquid phase transitions at surfaces 52, 63 are thus readily controllable by suitably varying the voltage potentials applied to the electrodes on those surfaces.

The left portion of FIG. 6 shows vapour barrier 57 created between liquid 56 and prismatic surface 52 by resistive heating of liquid 56 as aforesaid. Because vapourized Fluorinert has a different refractive index than liquid Fluorinert, there is a refractive index mismatch between prismatic surface 52 (for polycarbonate, n≈1.6) and vapour layer 57 (n≈1), provided resistive heating power is continuously applied to maintain vapour layer 57. Substantially less power is required to maintain vapour layer 57 than to create it, so the structure is reasonably bistable in the sense that only a small amount of current is required to flow through the heating electrodes to maintain the "on" state. This also reduces the overall power consumption of the device during operation.

A light ray 60 incident upon sheet 50 encounters the polycarbonate:vapour interface between surface 52 and vapour barrier 57 at an angle of about 45° by virtue of the prismatic facets on surface 52. Since 45° exceeds the critical angle (about 38° for a polycarbonate: vapour interface), ray 60 undergoes TIR twice (or three times, if the prismatic facets are corner reflectors) at surface 52 and emerges through viewing surface 62 in a direction substantially 180° opposite to the incident direction. Since the reflected ray emerges in a direction nearly opposite to the direction of the incident ray, viewing surface 62 exhibits a "white" appearance in the above-described "on" state. A diffuser can be overlaid on viewing surface 62 to enhance its white appearance in the "on" state.

In the "off" state, as illustrated on the centre portion of FIG. 6, liquid 56 does not undergo a phase transition, but remains in the liquid state adjacent prismatic surface 52. In this case, there is a small but not substantial refractive index mismatch between prismatic surface 52 and liquid 56 within chamber 53 (i.e. for polycarbonate, n≈1.6 and for pentane n≈1.36). TIR is thus prevented at the interface between prismatic surface 52 and liquid 56. An incident light ray 61 which encounters sheet 50 is refracted somewhat, but not substantially as it passes through the interface between prismatic surface 52 and liquid 56. For a polycarbonate:pentane interface, the refraction angle is about 12°. Ray 61 passes through liquid 56 and strikes black absorbing layer 51, which forms a thermal barrier between chambers 53, 54 as previously explained. Thus incident ray 61 is absorbed by barrier 51 and viewing surface 62 appears black in the "off" state.

The resistive heating electrode on prismatic surface 52 can be segmented to facilitate "addressing" of separate regions or "pixels" on surface 52, thus forming an image display. The individual pixels can be of a size comparable to the pixel size of a typical computer display monitor for high resolution applications, or can be as large as a few square centimetres for use in low resolution information displays. The pixels are bistable, in the sense that once vapour barrier 57 is created, it remains until the resistive heating voltage is removed, allowing the vapour to cool and condense back into the liquid state. High resolution pixels can be formed because the pixel size is determined by the size of the patterned electrodes applied to inward prismatic surface 52.

It can thus be seen that by controlling the liquid:vapour phase transition at retro-reflective surface 52, one may provide a high reflectivity, high contrast, and potentially low power image display. For low power operation, liquid 56 should have a low boiling point such that little input energy is required to vapourize the liquid. The input energy requirement can be reduced by maintaining liquid 56 in chambers 53, 54 at a pressure below atmospheric pressure.

A material's index of refraction determines the manner in which electromagnetic waves propagate through that material. If the material is a homogeneous dielectric, such as those previously discussed (air, glass, etc.), then the material's electrical conductivity is zero. Accordingly, the vector which characterizes the propagation of electromagnetic waves through the material is real (i.e. has no imaginary components). However, if the material's electrical conductivity is non-zero, then the vector which characterizes the propagation of electromagnetic waves through the material is complex (i.e. has both real and imaginary components). Because the material's index of refraction is related to the propagation vector, the index of refraction must also be represented by a complex number, $n_c$, where $n_c = n_R + i n_I$ with $n_R$ being the real component of the index of refraction, $n_I$ being the imaginary component, and $i = \sqrt{-1}$. $n_I$ determines the extent to which electromagnetic waves are absorbed by the conductive material. Such absorption occurs when energy is consumed in the production of a conduction current in the material as it interacts with the electromagnetic wave. A conductive material's absorption coefficient is related to $n_I$. By controlling a material's conductivity, one may in turn control the imaginary component ($n_I$) of the material's index of refraction, and thus control the material's absorption coefficient.

If a conventional retro-reflective surface contacts a material having controllable absorption, TIR can be controllably frustrated at the retro-reflective surface. If the material's absorption is low, a light ray incident on the retro-reflective surface undergoes TIR at the surface. As will now be explained, semiconductor techniques can be used to control a material's conductivity, thereby facilitating control of the material's absorption characteristics such that the material becomes highly absorptive in the evanescent wave region at the retro-reflective surface, controllably frustrating TIR.

Figure 7:
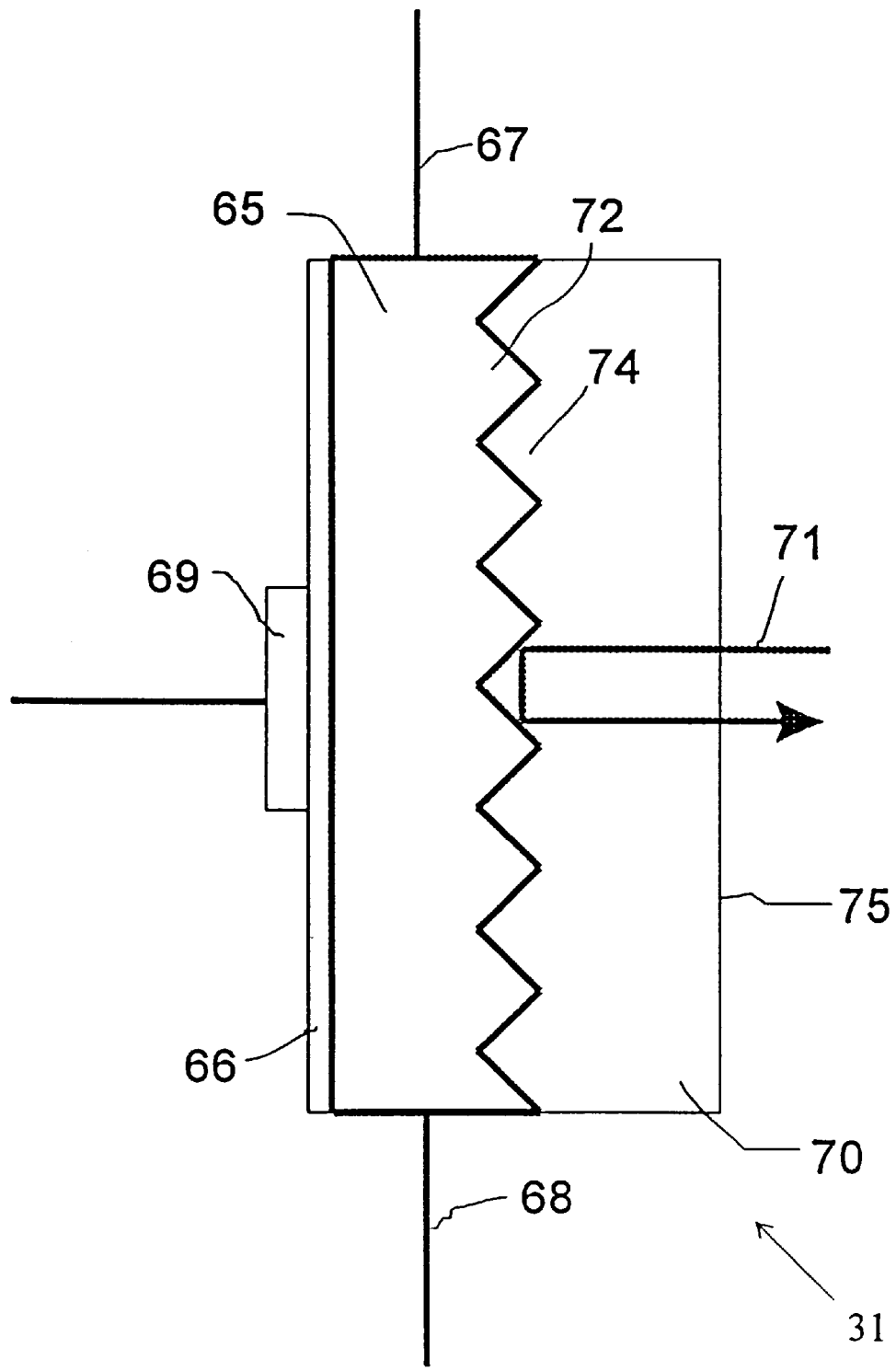
FIG. 7 depicts, on a greatly enlarged scale, a retro-reflective high refractive index prismatic surface to which electrodes are applied to form a metal oxide semiconductor field effect transistor ("MOSFET") having adjustable reflectivity.

FIG. 7 depicts a metal oxide semiconductor field effect transistor ("MOSFET") having a channel 65 formed of an n-type semi-conductor material bearing a metal oxide layer 66. Source and drain contacts 67, 68 are provided at opposed ends of channel 65. Because it contains a large number of majority charge carriers (i.e. electrons), channel 65 is highly electrically conductive. Accordingly, current flows readily between source 67 and drain 68 if an electrical voltage potential is applied therebetween. A gate contact 69 is provided on metal oxide layer 66. If a highly negative voltage potential is applied to gate 69, majority charge carriers move out of channel 65, reducing the channel's conductivity. The density of the majority charge carriers remaining in channel 65 depends upon the magnitude of the electric field in the region of gate 69. Accordingly, the conductivity of channel 65 can be controlled by controlling the voltage applied to gate 69.

The n-type semiconductor material used to fabricate channel 65 is a transparent material having an index of refraction $n_1$. A series of parallel prisms 72 are formed on the face of channel 65, opposite metal oxide layer 66. A sheet 70 of transparent material bearing a series of parallel prisms 74 identical to prisms 72 is fixed to sheet 70 such that prisms 72, 74 are interleaved. That is, the apex portion of each one of prisms 72 is fully inserted between the apex portions of an adjacent pair of prisms 74; and, the apex portion of each one of prisms 74 is fully inserted between the apex portions of an adjacent pair of prisms 72. Sheet 70 has an index of refraction $n_2$ where $n_2 > n_1$, and has a flat outward viewing surface 75.

The prismatic structure on sheet 70 can be fabricated by deposition of the material via sputtering or evaporation techniques into a machined mould bearing a physical "negative" of the desired retro-reflective prism-bearing surface. The outward surface of the deposited layer can be adhered to an additional flat sheet for support. The structured substrate can then be removed by a number of methods, such as etching away the substrate using a chemical etchant or by pulling the structured film free of the substrate using differential adhesion. Channel 65 can then be fabricated by similarly depositing a layer of n-type semiconductor material onto the structured surface of sheet 70. Well known surface treatment techniques are used to ensure adhesion of the interleaved portions of prisms 72, 74. Alternatively, channel 65 could be deposited first to generate prisms 72, with the material forming sheet 70 being subsequently deposited on prisms 72 to produce prisms 74 adherent on prisms 72 in the aforementioned interleaved fashion.

As explained above, the n-type semiconductor material used to fabricate channel 65 is selected such that the light absorbing characteristics of channel 65 vary as a function of the channel's conductivity. If a high voltage potential is applied to gate 69, channel 65 is in a low conductivity state, as explained above. When channel 65 is in a low conductivity state, it has very low light absorption. Consequently, incident light ray 71 undergoes TIR at the interface between prisms 72, 74 and viewing surface 75 has a highly reflective appearance, corresponding to the "on" state of the device. If the voltage applied to gate 69 is low, then channel 65 is in a high conductivity state, as explained above. When channel 65 is in a high conductivity state, it has relatively high light absorption. Consequently, incident light rays are absorbed at the interface between prisms 72, 74 and viewing surface 75 appears dark, corresponding to the "on" state of the device. Thus, the reflectivity of a selected region (i.e. "pixel") of the semiconductor material can be electrically controlled to form an image display. Semiconductor fabrication technology facilitates fabrication of extremely small structures, so this embodiment of the invention is capable of producing very high resolution displays.

Alternatively, a p-type semiconductor material can be used to fabricate channel 65. In this case, the majority charge carriers are positively-charged "holes" rather than negatively-charged electrons as in an n-type semiconductor, and the positions of source 67 and drain 68 are reversed. Again, the density of the majority charge carriers remaining in the channel depends on the magnitude of the electric field in the region of gate 69, so the channel's conductivity and hence the absorption characteristics at the interface of prisms 72, 74 can be controlled by suitably controlling the voltage applied to gate 69.

An electrochemical change in the property of an electrochromic material has been proposed as a technique for fabricating a flat panel display. When an electric field applied to an electrochromic material is changed, the material changes from transparent to opaque or coloured. The effect is reversible when a voltage of opposite polarity is applied. Although the effect cannot be reversed indefinitely, 10,000 or more switching cycles can be achieved. However, a significant disadvantage of electrochromic materials, in addition to the switching lifetime limitation, is slow switching speed. It can take several seconds for the absorption characteristics of an electrochromic material to change significantly, which is undesirable in general purpose display (i.e. computer monitor) applications. The long switching time is due to the large scale change required to alter the colour of the material throughout the entire electrochromic semiconductor material. However, such large scale changes are not necessary for successful operation of the FIG. 7 embodiment of the invention. It is only necessary to change the absorption characteristics of channel 65 in the thin region adjacent prisms 72 within which evanescent wave penetration occurs. If the overall thickness of channel 65 is about one micron, then the response of the semiconductor device will be substantially faster.

As will be apparent to those skilled in the art in the light of the foregoing disclosure, many alterations and modifications are possible in the practice of this invention without departing from the scope thereof. In particular, a very wide range of electrophoretic media and electrophoretic particles and high refractive index materials can be employed. Accordingly, the scope of the invention is to be construed in accordance with the substance defined by the following claims.

What is claimed is:

1. An image display device, comprising:
   (a) a reflective sheet having a prismatic inward surface and an opposed outward surface, said sheet having an index of refraction $n_1$;
   (b) an electrophoretic medium contacting said prismatic surface, said medium having an index of refraction $n_2$;
   (c) a plurality of particles suspended in said medium; and,
   (d) means for applying a voltage across said medium to selectively, electrophoretically move said particles within about 0.25 micron of said prismatic surface to frustrate total internal reflection at said prismatic surface of light rays passing through said sheet;
   wherein $n_2$ is sufficiently larger than $n_1$ that most of said light passing through said sheet undergoes total internal reflection at said prismatic surface in the absence of said applied voltage.

2. An image display device as defined in claim 1, wherein:
   (a) $n_1$ is within the range of 2.1 to 2.4; and,
   (b) $n_2$ is within the range of 1.25 to 1.27.

3. An image display device as defined in claim 1, wherein said medium is a low refractive index, low viscosity, electrically insulating liquid.

4. An image display device as defined in claim 1, wherein said medium is Fluorinert™ Electronic Liquid FC-72.

5. An image display device as defined in claim 1, wherein said medium is Fluorinert™ Electronic Liquid FC-75.

6. An image display device as defined in claim 1, wherein said sheet is optically clear zinc sulphide.

7. An image display device as defined in claim 1, wherein said sheet is optically clear zirconium oxide.

8. An image display device as defined in claim 3, wherein said sheet is optically clear zinc sulphide.

9. An image display device as defined in claim 3, wherein said sheet is optically clear zirconium oxide.

10. An image display device as defined in claim 1, wherein said sheet is optically clear titanium dioxide.

11. An image display device as defined in claim 3, wherein said sheet is optically clear titanium dioxide.

12. An image display device as defined in claim 1, wherein said particles have a sub-optical particle diameter.

13. An image display device as defined in claim 12, wherein said particle diameter is less than one micron.

14. An image display device as defined in claim 13, wherein said particle diameter is about 100 nm.

15. An image display method, comprising the steps of:
   (a) providing a reflective sheet having a prismatic inward surface and an opposed outward surface, said sheet having an index of refraction $n_1$;
   (b) contacting said prismatic surface with an electrophoretic medium having an index of refraction $n_2$;
   (c) suspending a plurality of particles in said medium; and,
   (d) applying a voltage across said medium to selectively, electrophoretically move said particles within about 0.25 micron of said prismatic surface to frustrate total internal reflection at said prismatic surface of light rays passing through said sheet;
   wherein $n_2$ is sufficiently larger than $n_1$ that most of said light passing through said sheet undergoes total internal reflection at said prismatic surface in the absence of said applied voltage.

16. An image display method as defined in claim 15, wherein:
   (a) $n_1$ is within the range of 2.1 to 2.4; and,
   (b) $n_2$ is within the range of 1.25 to 1.27.

17. An image display method as defined in claim 15, wherein said medium is a low refractive index, low viscosity, electrically insulating liquid.

18. An image display method as defined in claim 15, wherein said medium is Fluorinert™ Electronic Liquid FC-72.

19. An image display method as defined in claim 15, wherein said medium is Fluorinert™ Electronic Liquid FC-75.

20. An image display method as defined in claim 15, wherein said sheet is optically clear zinc sulphide.

21. An image display method as defined in claim 15, wherein said sheet is optically clear zirconium oxide.

22. An image display device as defined in claim 15, wherein said sheet is optically clear titanium dioxide.

23. An image display method as defined in claim 17, wherein said sheet is optically clear zinc sulfide.

24. An image display method as defined in claim 17, wherein said sheet is optically clear zirconium oxide.

25. An image display device as defined in claim 17, wherein said sheet is optically clear titanium dioxide.

26. An image display method as defined in claim 15, wherein said particles have a sub-optical particle diameter.

27. An image display method as defined in claim 26, wherein said particle diameter is less than one micron.

28. An image display method as defined in claim 27, wherein said particle diameter is about 100 nm.

29. An image display device comprising a reflective sheet having a prismatic inward surface and an opposed outward surface, said sheet having an index of refraction $n_1$, said prismatic inward surface having a vertical operating orientation in which said prismatic inward surface further comprises a vertically stacked plurality of horizontally extending prismatic segments, each one of said prismatic segments comprising a plurality of vertically extending and vertically inclined parallel prisms, said prisms having a length dimension and a height dimension, said length dimension being substantially greater than said height dimension.

30. An image display device as defined in claim 29, wherein said segments are inclined at an angle θ with respect to said vertical operating orientation, where:

$$\theta = \frac{1}{2}\arcsin\left(\frac{n_2\sin\phi}{n_1}\right)$$

φ is the an angle at which ambient light is incident with respect to said vertical operating orientation, and $n_2$ is the index of refraction of a medium adjacent said outward surface through which said ambient light passes.

31. An image display device as defined in claim 30, wherein $n_2 \approx 1$, $n_1 \approx 2.4$ and $\phi \approx 45°$.

32. An image display device as defined in claim 29, further comprising:
 (a) an electrophoretic medium contacting said prismatic surface, said medium having an index of refraction $n_3$;
 (b) a plurality of particles suspended in said medium; and,
 (c) means for applying a voltage across said medium to selectively, electrophoretically move said particles within about 0.25 micron of said prismatic surface to frustrate total internal reflection at said prismatic surface of light rays passing through said sheet;
 wherein $n_3$ is sufficiently larger than $n_1$ that most of said light passing through said sheet undergoes total internal reflection at said prismatic surface in the absence of said applied voltage.

33. An image display device, comprising:
 (a) a transparent, planar slab waveguide;
 (b) a light source for emitting light into said waveguide; and,
 (c) a micro-structured array mounted on a rearward surface of said waveguide, said array for uniformly extracting light rays from said waveguide and redirecting said rays rearwardly of said array at an angle of approximately 45°.

34. An image display device as defined in claim 33, further comprising:
 (a) a reflective sheet mounted rearwardly of said array, said sheet having a prismatic rearward surface and an opposed forward surface, said sheet having an index of refraction $n_1$ said prismatic rearward surface having a vertical operating orientation in which said prismatic rearward surface further comprises a vertically stacked plurality of horizontally extending prismatic segments, each one of said prismatic segments comprising a plurality of vertically extending and vertically inclined parallel prisms, said prisms having a length dimension and a height dimension, said length dimension being substantially greater than said height dimension;
 (b) an electrophoretic medium contacting said prismatic surface, said medium having an index of refraction $n_2$;
 (c) a plurality of particles suspended in said medium; and,
 (d) means for applying a voltage across said medium to selectively, electrophoretically move said particles within about 0.25 micron of said prismatic surface to frustrate total internal reflection at said prismatic surface of light rays passing through said sheet;
 wherein $n_2$ is sufficiently larger than $n_1$ that most of said light passing through said sheet undergoes total internal reflection at said prismatic surface in the absence of said applied voltage.

35. An image display device as defined in claim 33, further comprising: an array of micro-structured lenses mounted rearwardly of said micro-structured array, said lenses for further uniformly extracting said rays from said waveguide and redirecting said rays rearwardly at an angle of approximately 45°.

36. An image display device as defined in claim 33, wherein said light source is a multi-coloured light source, said image display device further comprising means for actuating said light source to emit light rays of a selected colour into said waveguide.

37. An image display device, comprising:
 (a) a reflective sheet having a prismatic inward surface and an opposed outward surface, said sheet having an index of refraction $n_1$;
 (b) a backing sheet coupled to said reflective sheet to form a liquid and vapour tight chamber between said prismatic inward surface and said backing sheet;
 (c) a liquid within said chamber, said liquid having a low boiling point, a liquid state index of refraction $n_2$ approximately equal to $n_1$, and a vapour state index of refraction $n_3$ substantially unequal to $n_1$; and,
 (d) first voltage means for controllably applying a voltage to said prismatic inward surface to heat said prismatic inward surface and vapourize said liquid in a region proximate to said prismatic inward surface.

38. An image display device as defined in claim 37, further comprising second voltage means for controllably applying a voltage to said backing sheet to heat said backing sheet and vapourize said liquid in a region proximate to said backing sheet.

39. An image display device as defined in claim 37, wherein said reflective sheet comprises a polycarbonate material and said liquid is Fluorinert™.

40. An image display device as defined in claim 37, wherein said reflective sheet comprises a polycarbonate material and said liquid is pentane.

41. An image display device as defined in claim 37, wherein said reflective sheet comprises a polycarbonate material and said liquid is hexane.

42. An image display device as defined in claim 37, wherein said reflective sheet comprises 3M Diamond Grade™ reflective sheeting.

43. An image display device as defined in claim 37, wherein $n_1$ is about 1.6, $n_2$ is about 1.36 and $n_3$ is about 1.

44. An image display device as defined in claim 37, wherein said liquid is a low refractive index, low viscosity, electrically insulating liquid.

45. An image display device as defined in claim 37, wherein said liquid is Fluorinert Electronic Liquid.

46. An image display device as defined in claim 37, further comprising an apertured, light absorbing barrier extending horizontally between horizontally opposed surfaces of said prismatic inward surface and said backing sheet.

47. An image display device as defined in claim 37, wherein said first voltage means further comprises:
 (a) a transparent electrode on said prismatic inward surface; and, (b) a voltage source electrically connected to said electrode.

48. An image display device as defined in claim 37, wherein:
    (a) said first voltage means further comprises:
       (i) a first transparent electrode on said prismatic inward surface;
       (ii) a first voltage source electrically connected to said first electrode;
    (b) said second voltage means further comprises:
       (i) a second transparent electrode on said backing sheet; and,
       (ii) a second voltage source electrically connected to said second electrode.

49. An image display method, comprising the steps of:
    (a) providing a reflective sheet having a prismatic inward surface and an opposed outward surface, said sheet having an index of refraction $n_1$;
    (b) maintaining a liquid adjacent said prismatic inward surface, said liquid having a low boiling point, a liquid state index of refraction $n_2$ approximately equal to $n_1$, and a vapour state index of refraction $n_3$ substantially unequal to $n_1$; and,
    (c) heating said prismatic inward surface to vapourize said liquid in a region proximate to said prismatic inward surface.

50. An image display method as defined in claim 49, wherein said reflective sheet comprises a polycarbonate material and said liquid is a low refractive index, low viscosity, electrically insulating liquid.

51. An image display method as defined in claim 49, wherein said liquid is Fluorinert Electronic Liquid.

52. An image display method as defined in claim 49, wherein said reflective sheet comprises a polycarbonate material and said liquid is pentane.

53. An image display method as defined in claim 49, wherein said reflective sheet comprises a polycarbonate material and said liquid is hexane.

54. An image display method as defined in claim 49, wherein said reflective sheet comprises 3M Diamond Grade™ reflective sheeting.

55. An image display method as defined in claim 49, wherein $n_1$ is about 1.6, $n_2$ is about 1.36 and $n_3$ is about 1.

56. An image display method as defined in claim 49, wherein said liquid is Fluorinert™ Electronic Liquid FC-72.

57. An image display method as defined in claim 49, wherein said heating step further comprises resistively heating an electrode applied to said prismatic inward surface.

58. An image display method as defined in claim 49, further characterized by:
    (a) an "on" operating state in which said heating step is performed to vapourize said liquid, causing a refractive index mismatch at an interface between said vapourized liquid and said prismatic inward surface, totally internally reflecting light rays incident upon said interface; and,
    (b) an "off" operating state in which said heating step is inhibited, preventing vapourization of said liquid, causing a refractive index match at said interface sufficient to refract light rays incident upon said interface through said interface.

59. An image display device, comprising:
    (a) a transparent, semiconductor channel having a first prismatic surface and having an index of refraction $n_1$;
    (b) a metal oxide layer applied to a surface of said channel, opposite said prismatic surface;
    (c) a source electrode electrically connected to a first end of said channel;
    (d) a drain electrode electrically connected to a second end of said channel, opposite said first end; and,
    (e) a gate electrode electrically connected to said metal oxide layer;
    whereby application of a first voltage potential to said gate reduces said channel's light absorption coefficient, permitting total internal reflection of light rays at said first prismatic surface; and, application of a second voltage potential to said gate increases said channel's light absorption coefficient, frustrating total internal reflection of light rays at said first prismatic surface.

60. An image display device as defined in claim 59, further comprising a transparent sheet having a second prismatic surface fixed to and interleaved with said first prismatic surface, said sheet having an index of refraction $n_2 > n_1$ and having an opposed outward surface opposite said second prismatic surface.

* * * * *

UNITED STATES PATENT AND TRADEMARK OFFICE
CERTIFICATE OF CORRECTION

PATENT NO.    : 6,215,920 B1
DATED         : April 10, 2001
INVENTOR(S)   : Lorne A. Whitehead, Robin J.N. Coope, Dmitri N. Grandmaison, Michele A. Mossman and Andrzej Kotlicki It is certified that error appears in the above-identified patent and that said Letters Patent is hereby corrected as shown below:

Column 13,
Line 54, delete "$n_2$ is sufficiently larger $n_1$" and insert therefor -- $n_1$ is sufficiently larger than $n_2$ --.

Column 14,
Line 33, delete "$n_2$ is sufficiently larger $n_1$" and insert therefor -- $n_1$ is sufficiently larger than $n_2$ --.

Column 15,
Line 35, delete "$n_3$ is sufficiently larger $n_1$" and insert therefor -- $n_1$ is sufficiently larger than $n_3$ --.

Column 16,
Line 4, delete "$n_2$ is sufficiently larger $n_1$" and insert therefor -- $n_1$ is sufficiently larger than $n_2$ --.

Signed and Sealed this

Twenty-second Day of October, 2002

*Attest:*

JAMES E. ROGAN
*Attesting Officer*          *Director of the United States Patent and Trademark Office*